(12) United States Patent
Miyaishi et al.

(10) Patent No.: US 12,305,074 B2
(45) Date of Patent: May 20, 2025

(54) CORROSION-RESISTANT MEMBER

(71) Applicant: SHOWA DENKO K.K., Tokyo (JP)

(72) Inventors: So Miyaishi, Tokyo (JP); Masahiro Okubo, Tokyo (JP); Masayuki Yoshimura, Tokyo (JP); Wataru Sakane, Tokyo (JP); Teppei Tanaka, Tokyo (JP); Saeko Nakamura, Tokyo (JP); Takuya Imai, Tokyo (JP); Tetsuo Sakurai, Tokyo (JP); Koyuki Mesuda, Tokyo (JP)

(73) Assignee: Resonac Corporation, Tokyo (JP)

( * ) Notice: Subject to any disclaimer, the term of this patent is extended or adjusted under 35 U.S.C. 154(b) by 354 days.

(21) Appl. No.: 18/011,372

(22) PCT Filed: Jun. 21, 2021

(86) PCT No.: PCT/JP2021/023403
§ 371 (c)(1),
(2) Date: Dec. 19, 2022

(87) PCT Pub. No.: WO2022/038886
PCT Pub. Date: Feb. 24, 2022

(65) Prior Publication Data
US 2023/0235183 A1    Jul. 27, 2023

(30) Foreign Application Priority Data

Aug. 20, 2020 (JP) ................. 2020-139202

(51) Int. Cl.
*C09D 5/08* (2006.01)
*C09D 1/00* (2006.01)
*C09D 5/00* (2006.01)

(52) U.S. Cl.
CPC ............... *C09D 5/084* (2013.01); *C09D 1/00* (2013.01); *C09D 5/002* (2013.01)

(58) Field of Classification Search
None
See application file for complete search history.

(56) References Cited

U.S. PATENT DOCUMENTS 6,303,232 B1 * 10/2001 Mihoya .................. C23C 22/68
148/279
2003/0148035 A1   8/2003  Lingampalli
2004/0164125 A1   8/2004  Morley et al.

FOREIGN PATENT DOCUMENTS

CN    1511072 A      7/2004
JP    11-193478 A    7/1999
(Continued)

OTHER PUBLICATIONS

Aihara—JP 2000-212769 A—PCT D1—MT—corrosion resistant member—2000 (Year: 2000).*
(Continued)

*Primary Examiner* — John Vincent Lawler
(74) *Attorney, Agent, or Firm* — Sughrue Mion, PLLC

(57) ABSTRACT

There is provided a corrosion-resistant member in which a corrosion-resistant coating film is less likely to peel off from a base material even when the corrosion-resistant member is subjected to a thermal history. The corrosion-resistant member includes: a base material (10) containing aluminum or an aluminum alloy; and a corrosion-resistant coating film (20) formed on the surface of the base material (10), in which the corrosion-resistant coating film (20) contains aluminum fluoride hydroxide $AlF_{3-x}(OH)_x$ in which a space group belongs to R-3c, and x in the chemical formula is 0.05 or more and 1.00 or less.

10 Claims, 3 Drawing Sheets

(56) References Cited

FOREIGN PATENT DOCUMENTS

| JP | 20002172769 A | * | 8/2000 | ............. C23C 28/00 |
|----|---------------|---|--------|--------------------------|
| JP | 2000-212769 A |   | 8/2002 |                          |
| JP | 2004-011026 A |   | 1/2004 |                          |
| JP | 2005-533368 A |   | 11/2005|                          |
| JP | 2011-231404 A |   | 11/2011|                          |
| JP | 2017071843 A  | * | 4/2017 | ............. C23C 14/24 |

OTHER PUBLICATIONS

Sato—JP 2017-071843 A—IDS—MT—AlF O coating—2017 (Year: 2017).*
Internal Search Report for PCT/JP2021/023403, dated Aug. 31, 2021.

* cited by examiner

CORROSION-RESISTANT MEMBER

CROSS REFERENCE TO RELATED APPLICATIONS

This application is a National Stage of International Application No. PCT/JP2021/023403 filed Jun. 21, 2021, claiming priority based on Patent Japanese Application No. 2020-139202 filed Aug. 20, 2020.

TECHNICAL FIELD

The present invention relates to a corrosion-resistant member.

BACKGROUND ART

In a semiconductor manufacturing process, highly corrosive gases, such as a chlorine gas and a fluorine gas, are sometimes used, and therefore corrosion resistance is required in members (for example, showerheads) constituting semiconductor manufacturing equipment.

PTL 1 discloses a member, such as a showerhead, having an aluminum surface coated with a corrosion-resistant coating film containing at least one of aluminum fluoride and magnesium fluoride.

PTL 2 discloses a film forming material containing oxyfluoride of aluminum and describes that a coating film manufactured using this film forming material has high corrosion resistance against plasmas using halogen-based gases, such as a fluorine-based gas.

PTL 3 discloses a corrosion-resistant member in which an aluminum portion exposed to the surface of a composite containing aluminum is covered with fluoride. PTL 3 describes that the fluoride has a main crystal phase containing aluminum fluoride hydroxide presumed to be $Al_2F_3(OH)_3$ and has high corrosion resistance against halogen-based corrosive gases.

CITATION LIST

Patent Literatures

PTL 1: JP 2005-533368 A
PTL 2: JP 2017-71843 A
PTL 3: JP 2000-212769 A

SUMMARY OF INVENTION

Technical Problem

However, the members disclosed in PTLS 1 to 3 have had a problem that the corrosion-resistant coating film is likely to peel off from a base material by a thermal history.

It is an object of the present invention to provide a corrosion-resistant member in which a corrosion-resistant coating film is less likely to peel off from a base material even when the corrosion-resistant member is subjected to a thermal history.

Solution to Problem

To solve the above-described problem, one aspect of the present invention is as described in [1] to [5] below.

[1] A corrosion-resistant member includes: a base material containing aluminum or an aluminum alloy; and a corrosion-resistant coating film formed on the surface of the base material, in which the corrosion-resistant coating film contains aluminum fluoride hydroxide $AlF_{3-x}(OH)_x$ in which a space group belongs to R-3c, and x in the $AlF_{3-x}(OH)_x$ is 0.05 or more and 1.00 or less.

[2] The corrosion-resistant member according to [1], in which x in the $AlF_{3-x}(OH)_x$ is 0.10 or more and 0.70 or less.

[3] The corrosion-resistant member according to [1], in which x in the $AlF_{3-x}(OH)_x$ is 0.15 or more and 0.50 or less.

[4] The corrosion-resistant member according to any one of [1] to [3], in which the half width of the maximum intensity peak obtained by analyzing the aluminum fluoride hydroxide by an X-ray diffraction method is 0.50° or less.

[5] The corrosion-resistant member according to any one of [1] to [4], in which
the base material contains an aluminum alloy containing magnesium, and
an intermediate layer containing magnesium fluoride is arranged between the base material and the corrosion-resistant coating film.

Advantageous Effects of Invention

In the corrosion-resistant member according to the present invention, the corrosion-resistant coating film is less likely to peel off from the base material even when the corrosion-resistant member is subjected to a thermal history.

DESCRIPTION OF EMBODIMENTS

Hereinafter, one embodiment of the present invention will be described. This embodiment describes one example of the present invention, and the present invention is not limited to this embodiment. Further, this embodiment can be variously altered or modified and embodiments obtained by such alternations or modifications may also be included in the present invention.

Figure 1:
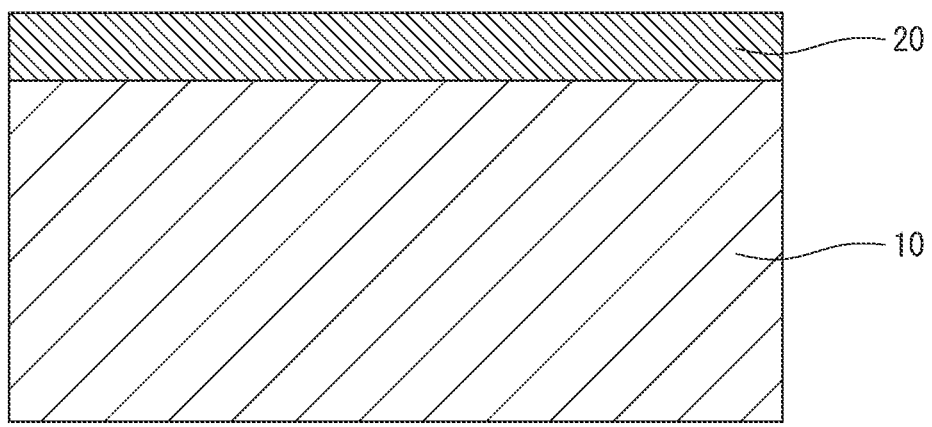
FIG. 1 is a cross-sectional view illustrating the configuration of a corrosion-resistant member according to one embodiment of the present invention.

A corrosion-resistant member according to this embodiment includes a base material 10 containing aluminum (Al) or an aluminum alloy and a corrosion-resistant coating film 20 formed on the surface of the base material 10 as illustrated in FIG. 1. The corrosion-resistant coating film 20 contains aluminum fluoride hydroxide $AlF_{3-x}(OH)_x$ in which a space group belongs to R-3c, and x in the chemical formula is 0.05 or more and 1.00 or less. The corrosion-resistant coating film 20 may contain the aluminum fluoride hydroxide $AlF_{3-x}(OH)_x$ or a mixture containing the aluminum fluoride hydroxide $AlF_{3-x}(OH)_x$ and the other materials.

Even when the corrosion-resistant member having such a structure is subjected to a thermal history, the corrosion-resistant coating film 20 is less likely to peel off from the base material 10. In particular, the corrosion-resistant member according to this embodiment has excellent corrosion resistance against corrosive gases, such as halogen gases (e.g., a fluorine gas $(F_2)$ and a chlorine gas $(Cl_2)$) and plasmas thereof, used as a cleaning gas in a semiconductor manufacturing process and an oxygen gas ($O_2$) and plasmas thereof used as a process gas in the semiconductor manufacturing process. Thus, even when the corrosion-resistant member is subjected to a thermal history in these gases or plasmas thereof, the corrosion-resistant coating film 20 is less likely to peel off from the base material 10.

Even when the corrosion-resistant member according to this embodiment is subjected to a thermal history, the corrosion-resistant coating film 20 is less likely to peel off from the base material 10, and therefore the corrosion-resistant member also has an effect of suppressing the generation of particles caused by the peeling of the corrosion-resistant coating film 20.

The corrosion-resistant member according to this embodiment is suitable as a member required to have corrosion resistance and heat resistance, and is suitable as a member constituting semiconductor manufacturing equipment (particularly, a film deposition device using a chemical vapor deposition method), for example. As a specific example, the corrosion-resistant member is suitable as a susceptor, a showerhead, or a chamber body of a film deposition device forming a thin film on a wafer. The use of the corrosion-resistant member according to this embodiment as the member constituting the semiconductor manufacturing equipment suppresses the generation of particles, and therefore semiconductors can be manufactured with a high yield.

x in the $AlF_{3-x}(OH)_x$ can be measured by an X-ray photoelectron spectroscopy (XPS) method. Examples of a measurement device include a scanning X-ray photoelectron spectrometer Quantera II (registered trademark) manufactured by ULVAC-PHI, INCORPORATED. One example of X-ray conditions is Al monochrome 100 μm, 25 W, 15 kV, and the analysis area may be set to 100 pmt. Further, an electron/ion neutralizing gun may be turned on and the photoelectron extraction angle may be set to 45°.

In the X-ray photoelectron spectroscopy, surface etching and analysis by argon (Ar) ion sputtering are alternately performed to obtain a depth profile of the corrosion-resistant coating film 20. The argon ion sputtering at this time is carried out under the conditions where the accelerating voltage is set to 2 kV and silicon dioxide ($SiO_2$) is surface-etched only by 9.1 nm/min. The surface etching amount of the corrosion-resistant coating film 20 is calculated based on this value.

The value obtained by the X-ray photoelectron spectroscopy is quantified by a relative sensitivity factor method. At this time, when the amount of oxygen atoms at a 30% depth position of the thickness of the corrosion-resistant coating film 20 was a (atom %) and the amount of fluorine atoms was b (atom %) with the surface as a reference, x in the $AlF_{3-x}(OH)_x$ is calculated by a calculation expression $x=3a/(a+b)$.

The space group of the aluminum fluoride hydroxide $AlF_{3-x}(OH)_x$ can be measured by analyzing the corrosion-resistant coating film 20 by a grazing incidence X-ray diffraction method. Examples of measurement devices include an X-ray diffraction device X'Pert PRO MPD manufactured by PANalytical.

A Cu anode is usable as a target, a collimator CCD is usable as a detector, and a parallel beam is usable as an optical system. The tube voltage may be set to 45 kV, the tube current may be set to 40 mA, the scan range may be set to 10° to 40°, the scan step size may be set to 0.05°, the scan speed may be set to 0.5°/min, and the X-ray incident angle may be set to 1.0°.

The type of the space group is determined referring to a PDF database (=powder X-ray database (Powder Diffraction File (PDF) of International Centre for Diffraction Data; ICDD) from a peak profile obtained by the X-ray diffraction.

x in the chemical formula is required to be 0.05 or more and 1.00 or less and is preferably 0.10 or more and 0.70 or less and more preferably 0.15 or more and 0.50 or less. Thus, the effect that the corrosion-resistant coating film 20 is less likely to peel off from the base material 10 even when the corrosion-resistant member is subjected to a thermal history is further enhanced.

In the aluminum fluoride hydroxide $AlF_{3-x}(OH)_x$ contained in the corrosion-resistant coating film 20, the half width of the maximum intensity peak obtained by the analysis by the X-ray diffraction method is preferably 0.60° or less and more preferably 0.50° or less. Thus, the effect that the corrosion-resistant coating film 20 is less likely to peel off from the base material 10 even when the corrosion-resistant member is subjected to a thermal history under various gas atmospheres is further enhanced.

The half width of the aluminum fluoride hydroxide $AlF_{3-x}(OH)_x$ can be measured by analyzing the corrosion-resistant coating film 20 by the grazing incidence X-ray diffraction method as with the space group. Examples of measurement devices include an X-ray diffraction device X'Pert PRO MPD manufactured by PANalytical, for example, as with the space group.

The half width above can be obtained by determining the half width of the maximum intensity peak appearing at 24° to 26° of the peak profile obtained by the X-ray diffraction. This peak belongs to the plane with a Miller index of (012).

In the corrosion-resistant member according to this embodiment, the thickness of the corrosion-resistant coating film 20 is preferably 0.1 μm or more and 50 μm or less and more preferably 0.2 μm or more and 10 μm or less. Then, the corrosion resistance of the corrosion-resistant member according to this embodiment is further increased. Examples of methods for measuring the thickness of the corrosion-resistant coating film 20 include, but are not particularly limited to, a transmission electron microscope (TEM), a scanning transmission electron microscope (STEM), a scanning electron microscope (SEM), and the like.

In the corrosion-resistant member according to this embodiment, the base material 10 preferably contains an aluminum alloy containing magnesium (Mg), more preferably contains an aluminum alloy containing 0.5% by mass or more of magnesium, and still more preferably contains an aluminum alloy containing 0.7% by mass or more and 10% by mass or less of magnesium.

In that case, an intermediate layer (not illustrated in FIG. 1) containing magnesium fluoride ($MgF_2$) is preferably arranged between the base material 10 and the corrosion-resistant coating film 20. The arrangement of the intermediate layer between the base material 10 and the corrosion-resistant coating film 20 further enhances the effect that the corrosion-resistant coating film 20 is less likely to peel off from the base material 10 even when the corrosion-resistant member is subjected to a thermal history. Since the base material 10 contains the aluminum alloy containing magnesium, the strength of the corrosion-resistant member is increased.

At this time, the thickness of the intermediate layer is preferably 0.1 μm or more and 3.0 μm or less and more preferably 0.2 μm or more and 1.0 μm or less. This further enhances the effect that the corrosion-resistant coating film 20 is less likely to peel off from the base material 10 even when the corrosion-resistant member is subjected to a thermal history. A method for measuring the thickness of the intermediate layer is the same as the method for measuring the thickness of the corrosion-resistant coating film 20.

Next, a method for manufacturing the corrosion-resistant member according to this embodiment is described. Examples of methods for manufacturing the corrosion-resistant member according to this embodiment include, but are not particularly limited to, a method for forming an aluminum fluoride hydroxide $AlF_{3-x}(OH)_x$ coating film via a coating film of a precursor of the aluminum fluoride hydroxide $AlF_{3-x}(OH)_x$. This method makes it easy to uniformly generate the corrosion-resistant coating film 20.

The manufacturing method via the precursor coating film is described in detail. The method includes forming the coating film of the aluminum fluoride hydroxide $AlF_{3-x}(OH)_x$ precursor on the surface of the base material 10 containing aluminum or an aluminum alloy, heat treating the precursor coating film in a fluorine-containing gas and changing the precursor to the aluminum fluoride hydroxide $AlF_{3-x}(OH)_x$, and forming the corrosion-resistant coating film 20 containing the aluminum fluoride hydroxide $AlF_{3-x}(OH)_x$ on the surface of the base material 10.

Examples of methods for forming the precursor coating film on the surface of the base material 10 include methods, such as chemical treatment, anodization, electrophoretic deposition, and vapor deposition.

Examples of the aluminum fluoride hydroxide $AlF_{3-x}(OH)_x$ precursor include aluminum oxide ($Al_2O_3$), aluminum hydroxide ($Al(OH)_3$), aluminum oxide hydroxide ($AlO(OH)$), aluminum fluoride hydroxide ($AlF(OH)_2$ and the like), aluminum oxyfluoride (AlOF), and aluminum fluoride ($AlF_3$). The precursor coating film may contain one of these compounds or may contain two or more kinds of these compounds. These compounds may be anhydrates, hydrates, crystalline, or amorphous.

When the thickness of the formed precursor coating film is set to 0.1 µm or more and 50 µm or less, the thickness of the corrosion-resistant coating film 20 can be set to 0.1 µm or more and 50 µm or less.

The type of the fluorine-containing gas used in the heat treatment of the precursor coating film is not particularly limited insofar as it is a fluorine-containing compound gas, and a gas is preferable which contains at least one of a fluorine gas, a hydrogen fluoride (HF) gas, a nitrogen trifluoride ($NF_3$) gas, a carbon tetrafluoride ($CF_4$) gas, a trifluoromethane gas ($CHF_3$), a hexafluoroethane ($C_2F_6$) gas, and a hexafluorobutadiene gas ($C_4F_6$). A mixed gas containing a fluorine-containing gas and an inert gas, such as a nitrogen gas ($N_2$) and an argon gas, may be used in the heat treatment of the precursor coating film.

The treatment temperature in the heat treatment is preferably 220° C. or more and 475° C. or less, more preferably 250° C. or more and 460° C. or less, and still more preferably 280° C. or more and 450° C. or less. The treatment time of the heat treatment is preferably 2 hours or more and 240 hours or less, more preferably 3 hours or more and 150 hours or less, and still more preferably 5 hours or more and 100 hours or less.

When the treatment temperature in the heat treatment is 220° C. or more and the treatment time in the heat treatment is 2 hours or more, x of the aluminum fluoride hydroxide $AlF_{3-x}(OH)_x$ in which the space group belongs to R-3c is likely to be 1.00 or less.

When the treatment temperature in the heat treatment is 475° C. or less and the treatment time in the heat treatment is 240 hours or less, x of the aluminum fluoride hydroxide $AlF_{3-x}(OH)_x$ in which the space group belongs to R-3c is likely to be 0.05 or more.

When the treatment temperature in the heat treatment is 300° C. or more and the treatment time in the heat treatment is 3 hours or more, the half width of the maximum intensity peak (i.e., peak of the (012) plane) obtained by analyzing the aluminum fluoride hydroxide $AlF_{3-x}(OH)_x$ by the X-ray diffraction method is likely to be 0.60° or less.

When the treatment temperature in the heat treatment is 300° C. or more and the treatment time in the heat treatment is 3 hours or more, the thickness of the intermediate layer containing magnesium fluoride is likely to be 0.1 µm or more.

When the treatment temperature in the heat treatment is 475° C. or less and the treatment time in the heat treatment is 150 hours or less, the thickness of the intermediate layer containing magnesium fluoride is likely to be 3.0 µm or less.

EXAMPLES

Hereinafter, the present invention is more specifically described with reference to Examples and Comparative Examples.

Example 1

On the surface of a base material containing an aluminum alloy A5052 (JIS standard) containing 2.55% by mass of magnesium and having dimensions of a width of 20 mm, a length of 30 mm, and a thickness of 2 mm, a corrosion-resistant coating film was formed. First, treatment described below was applied to the base material.

A degreasing liquid was obtained by dissolving 70 g of S-CLEAN AL-13 (manufactured by SASAKI CHEMICAL CO., LTD.) in 1 L of water and setting the temperature to 50° C., the base material was immersed in this degreasing liquid for 10 min for degreasing, followed by cleaning with pure water. Next, an etchant was obtained by heating 500 g of S-CLEAN AL-5000 (manufactured by SASAKI CHEMICAL CO., LTD.) to 70° C., and then the degreased base material was immersed in this etchant for 1 minute for etching, followed by cleaning with pure water. Thereafter, a smut removing liquid was obtained by dissolving 200 g of Smut Clean (Raiki K.K.) in 400 g of water and setting the temperature to 25° C., and then the etched base material was immersed in the smut removing liquid for 30 seconds for removal of smut, followed by cleaning with pure water. Then, the base material from which smut was removed was vacuum-dried to complete the pretreatment.

In a Teflon (registered trademark) container containing 1.0 g of an aluminum fluoride powder (manufactured by FUJIFILM Wako Pure Chemical Corporation) and 99.0 g of ultrapure water, the base material subjected to the above-described pretreatment was immersed, the Teflon container was covered with a lid, and then the Teflon container was placed in a SUS container (autoclave reactor) and covered with a lid. By performing heating at 200° C. for 10 hours using this autoclave reactor, the surface of the base material subjected to the above-described pretreatment was coated with an aluminum fluoride hydroxide $AlF_{3-x}(OH)_x$ precursor coating film.

The base material having the surface covered with the precursor coating film was heated to 400° C. in a mixed gas atmosphere containing 20% by volume of a fluorine gas and 80% by volume of a nitrogen gas and heat treated for 10 hours. This heat treatment changed the precursor to aluminum fluoride hydroxide $AlF_{3-x}(OH)_x$, so that a corrosion-resistant coating film was formed. In this heat treatment, magnesium contained in the base material was diffused to the surface of the base material, and therefore a film (intermediate layer) containing magnesium fluoride was formed between the corrosion-resistant coating film and the base material. Such treatment provided a corrosion-resistant member having the corrosion-resistant coating film on the surface of the base material.

As a result of analyzing the corrosion-resistant coating film by the X-ray photoelectron spectroscopy (XPS), x of the aluminum fluoride hydroxide $AlF_{3-x}(OH)_x$ constituting the corrosion-resistant coating film was 0.84. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was R-3c and the half width of the maximum intensity peak was 0.44°.

The obtained corrosion-resistant member of Example 1 was subjected to a heating test, and the peeling state of the corrosion-resistant coating film was evaluated. The conditions of the heating test are as follows: a step of increasing the temperature to 350° C. in one hour in a nitrogen gas atmosphere, holding the corrosion-resistant member at 350° C. for 300 min, and then cooling the corrosion-resistant member to room temperature in one hour was set as one cycle, and 10 cycles were performed.

After the heating test was completed, the corrosion-resistant coating film of the corrosion-resistant member was observed with a scanning electron microscope, and the peeling degree of the corrosion-resistant coating film was evaluated. The results are shown in Table 1. In Table 1, a case where the area of a peeled portion of the corrosion-resistant coating film was less than 1% of the entire area of the corrosion-resistant coating film is indicated as A, a case where the area was 1% or more and less than 5% is indicated as B, a case where the area was 5% or more and less than 30% is indicated as C, and a case where the area was 30% or more is indicated as D.

The obtained corrosion-resistant member of Example 1 was subjected to a corrosion test, and the peeling state of the corrosion-resistant coating film was evaluated. The corrosion test includes performing a step of sequentially heat treating one corrosion-resistant member in a chlorine gas atmosphere, in a fluorine gas atmosphere, and in an oxygen gas atmosphere in this order as one cycle, and performing five cycles. Each gas atmosphere above is a mixed gas atmosphere containing 20% by volume of a chlorine gas, a fluorine gas, or an oxygen gas and 80% by volume of a nitrogen gas. The heat treatment temperature is 250° C. and the heat treatment time is 300 min.

After the corrosion test was completed, the corrosion-resistant coating film of the corrosion-resistant member was observed with a scanning electron microscope, and the cracking degree was evaluated. 20 view fields were confirmed at a magnification of 500× and the number of the view fields where cracking had occurred was counted. The results are shown in Table 1. In Table 1, a case where the number of the visual fields where cracking had occurred was 0 is indicated as A, a case where the number of the visual fields was 1 or more and less than 5 is indicated as B, a case where the number of the visual fields was 5 or more and less than 10 is indicated as C, and a case where the number of the visual fields was 10 or more is indicated as D.

TABLE 1

| | Heat treatment | | | $AlF_{3-x}(OH)_x$ | | Thickness of corrosion- | Thickness of | State of corrosion-resistant coating film | |
| | Temperature (° C.) | Time (h) | Base material | X | Space group | Half width (°) | resistant coating film (μm) | intermediate layer (μm) | After heating test | After corrosion test |
| --- | --- | --- | --- | --- | --- | --- | --- | --- | --- | --- |
| Ex. 1 | 400 | 10 | A5052 | 0.84 | R-3c | 0.44 | 1.1 | 0.1 | B | B |
| Ex. 2 | 400 | 20 | A5052 | 0.17 | R-3c | 0.47 | 1.1 | 0.3 | A | A |
| Ex. 3 | 430 | 20 | A5052 | 0.12 | R-3c | 0.46 | 1.0 | 0.3 | B | A |
| Ex. 4 | 400 | 12 | A5052 | 0.68 | R-3c | 0.42 | 1.0 | 0.1 | B | A |
| Ex. 5 | 400 | 15 | A5052 | 0.47 | R-3c | 0.47 | 1.0 | 0.2 | A | A |
| Ex. 6 | 400 | 20 | A1080 | 0.20 | R-3c | 0.47 | 1.4 | — | B | A |
| Comp. Ex. 1 | 400 | 1 | A5052 | 1.13 | R-3c | 0.72 | 1.1 | 0.1 | A | C |
| Comp. Ex. 2 | 200 | 20 | A5052 | 1.61 | Fd-3m | — | 1.1 | — | C | D |
| Comp. Ex. 3 | 480 | 300 | A5052 | 0.04 | R-3c | 0.30 | 1.2 | 0.5 | D | A |
| Comp. Ex. 4 | — | — | A5052 | 2.19 | — | — | 1.1 | — | D | D |

Example 2

A corrosion-resistant member was manufactured in the same manner as in Example 1, except for changing the conditions of the heat treatment of heating the base material having the surface covered with the precursor coating film in a mixed gas atmosphere containing 20% by volume of a fluorine gas and 80% by volume of a nitrogen gas to the temperature of 400° C. and the treatment time of 20 hours.

Figure 2:
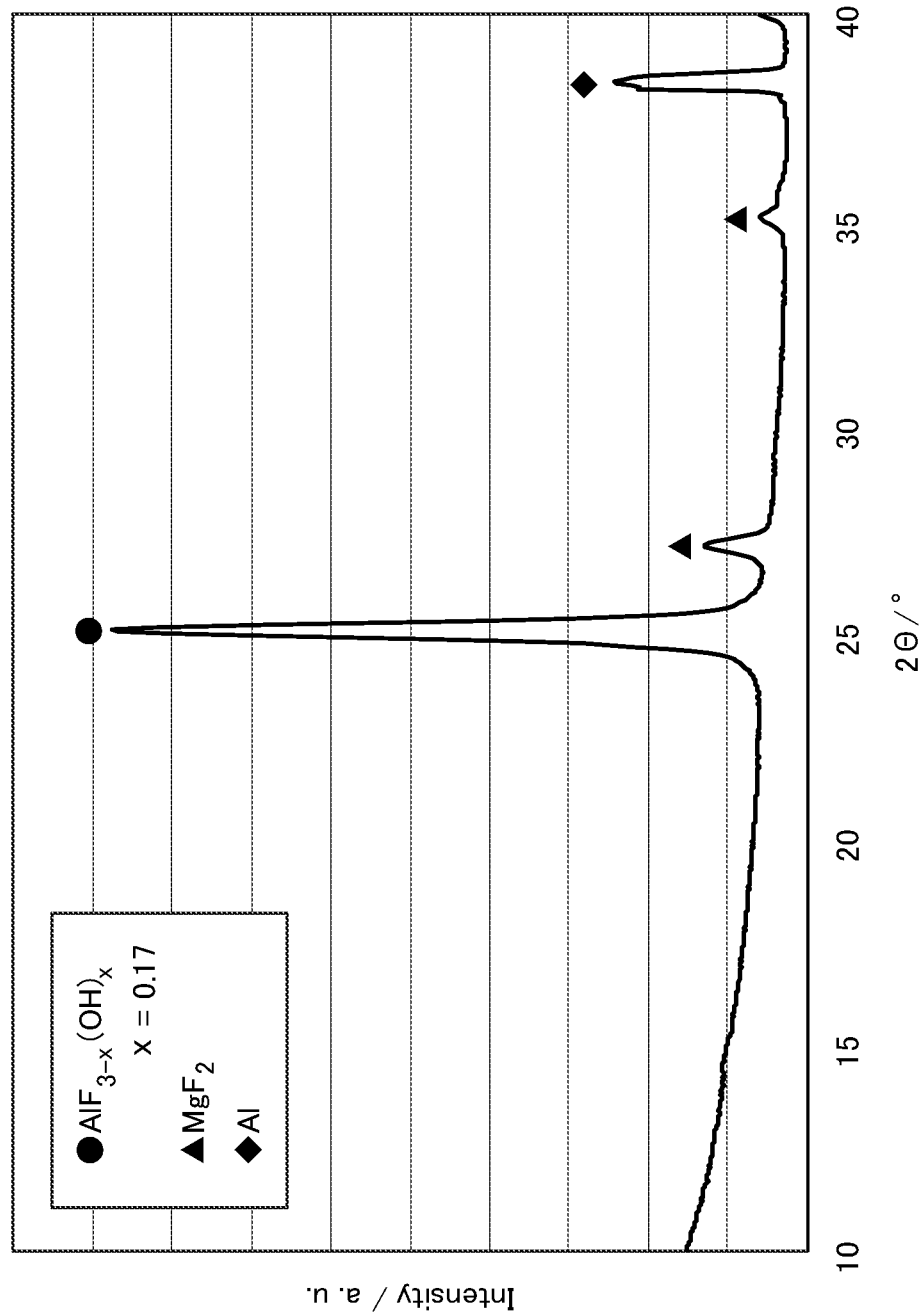
FIG. 2 is an X-ray diffraction pattern in which a corrosion-resistant coating film possessed by a corrosion-resistant member of Example 2 is analyzed.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 0.17. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was R-3c and the half width of the maximum intensity peak was 0.47°. An X-ray diffraction pattern at this time is illustrated in FIG. 2.

The obtained corrosion-resistant member of Example 2 was subjected to a heating test, and the peeling state of the corrosion-resistant coating film was evaluated. The obtained corrosion-resistant member of Example 2 was subjected to a corrosion test, and the crack state of the corrosion-resistant coating film was evaluated. The results are shown in Table 1.

Example 3

A corrosion-resistant member was manufactured in the same manner as in Example 1, except for changing the conditions of the heat treatment of heating the base material having the surface covered with the precursor coating film in a mixed gas atmosphere containing 20% by volume of a fluorine gas and 80% by volume of a nitrogen gas to the temperature of 430° C. and the treatment time of 20 hours.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 0.12. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was R-3c and the half width of the maximum intensity peak was 0.46°.

The obtained corrosion-resistant member of Example 3 was subjected to a heating test, and the peeling state of the corrosion-resistant coating film was evaluated. The obtained corrosion-resistant member of Example 3 was subjected to a corrosion test, and the crack state of the corrosion-resistant coating film was evaluated. The results are shown in Table 1.

Example 4

A corrosion-resistant member was manufactured in the same manner as in Example 1, except for changing the conditions of the heat treatment of heating the base material having the surface covered with the precursor coating film in a mixed gas atmosphere containing 20% by volume of a fluorine gas and 80% by volume of a nitrogen gas to the temperature of 400° C. and the treatment time of 12 hours.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 0.68. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was R-3c and the half width of the maximum intensity peak was 0.42°.

The obtained corrosion-resistant member of Example 4 was subjected to a heating test, and the peeling state of the corrosion-resistant coating film was evaluated. The obtained corrosion-resistant member of Example 4 was subjected to a corrosion test, and the crack state of the corrosion-resistant coating film was evaluated. The results are shown in Table 1.

Example 5

A corrosion-resistant member was manufactured in the same manner as in Example 1, except for changing the conditions of the heat treatment of heating the base material having the surface covered with the precursor coating film in a mixed gas atmosphere containing 20% by volume of a fluorine gas and 80% by volume of a nitrogen gas to the temperature of 400° C. and the treatment time of 15 hours.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 0.47. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was R-3c and the half width of the maximum intensity peak was 0.47°.

The obtained corrosion-resistant member of Example 5 was subjected to a heating test, and the peeling state of the corrosion-resistant coating film was evaluated. The obtained corrosion-resistant member of Example 5 was subjected to a corrosion test, and the crack state of the corrosion-resistant coating film was evaluated. The results are shown in Table 1.

Example 6

A corrosion-resistant member was manufactured in the same manner as in Example 1, except for using a base material containing pure aluminum (JIS standard: A1080) not containing magnesium in place of the base material containing the aluminum alloy A5052 containing 2.55% by mass of magnesium.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 0.20. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was R-3c and the half width of the maximum intensity peak was 0.47°.

The obtained corrosion-resistant member of Example 6 was subjected to a heating test, and the peeling state of the corrosion-resistant coating film was evaluated. The obtained corrosion-resistant member of Example 6 was subjected to a corrosion test, and the crack state of the corrosion-resistant coating film was evaluated. The results are shown in Table 1.

Comparative Example 1

A corrosion-resistant member was manufactured in the same manner as in Example 1, except for changing the conditions of the heat treatment of heating the base material having the surface covered with the precursor coating film in a mixed gas atmosphere containing 20% by volume of a fluorine gas and 80% by volume of a nitrogen gas to the temperature of 400° C. and the treatment time of 1 hour.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 1.13. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was R-3c and the half width of the maximum intensity peak was 0.72°.

The obtained corrosion-resistant member of Comparative Example 1 was subjected to a heating test, and the peeling state of the corrosion-resistant coating film was evaluated. The obtained corrosion-resistant member of Comparative Example 1 was subjected to a corrosion test, and the crack state of the corrosion-resistant coating film was evaluated. The results are shown in Table 1.

Comparative Example 2

A corrosion-resistant member was manufactured in the same manner as in Example 1, except for changing the conditions of the heat treatment of heating the base material having the surface covered with the precursor coating film in a mixed gas atmosphere containing 20% by volume of a fluorine gas and 80% by volume of a nitrogen gas to the temperature of 200° C. and the treatment time of 20 hours.

Figure 3:
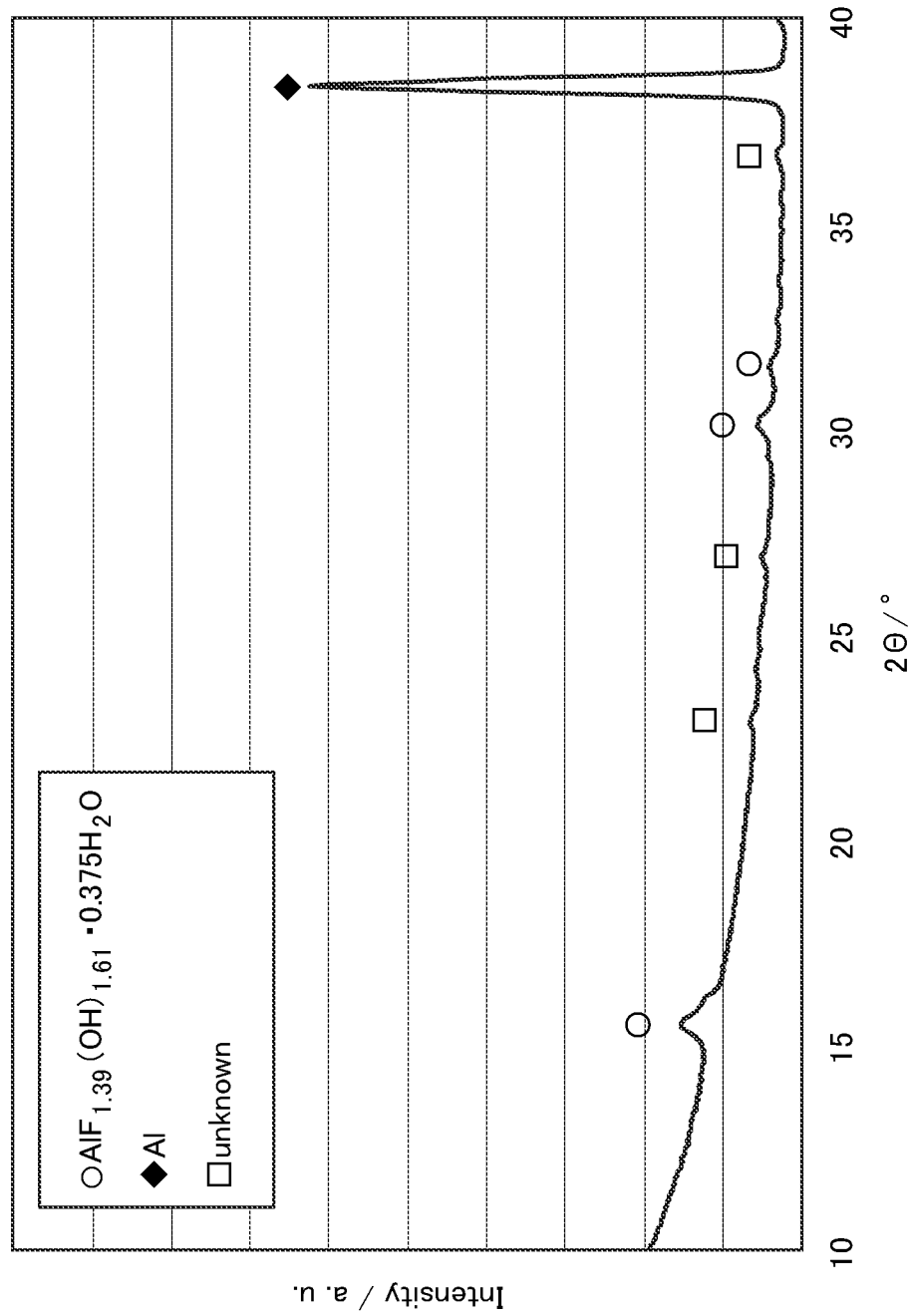
FIG. 3 is an X-ray diffraction pattern in which a corrosion-resistant coating film possessed by a corrosion-resistant member of Comparative Example 2 is analyzed.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 1.61. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was Fd-3m and the half width of the maximum intensity peak was difficult to determine. An X-ray diffraction pattern at this time is illustrated in FIG. 3.

The obtained corrosion-resistant member of Comparative Example 2 was subjected to a heating test, and the peeling state of the corrosion-resistant coating film was evaluated. The obtained corrosion-resistant member of Comparative Example 2 was subjected to a corrosion test, and the crack state of the corrosion-resistant coating film was evaluated. The results are shown in Table 1.

Comparative Example 3

A corrosion-resistant member was manufactured in the same manner as in Example 1, except for changing the conditions of the heat treatment of heating the base material having the surface covered with the precursor coating film in a mixed gas atmosphere containing 20% by volume of a fluorine gas and 80% by volume of a nitrogen gas to the temperature of 480° C. and the treatment time of 300 hours.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 0.04. As a result of analyzing the corrosion-resistant coating film by the grazing incidence X-ray diffraction method, the space group of the aluminum fluoride hydroxide $AlF_{3-x}(OH)_x$ constituting the corrosion-resistant coating film was R-3c and the half width of the maximum intensity peak was 0.30°.

The obtained corrosion-resistant member of Comparative Example 3 was subjected to a heating test, and the peeling state of the corrosion-resistant coating film was evaluated. The obtained corrosion-resistant member of Comparative Example 3 was subjected to a corrosion test, and the crack state of the corrosion-resistant coating film was evaluated. The results are shown in Table 1.

Comparative Example 4

A corrosion-resistant member was manufactured in the same manner as in Example 1, except for not applying the heat treatment to the base material having the surface covered with the precursor coating film.

As a result of analyzing the corrosion-resistant coating film by the X-ray photoelectron spectroscopy, x of the aluminum fluoride hydroxide $AlF_{3-x}(OH)_x$ constituting the corrosion-resistant coating film was 2.19. As a result of analyzing the corrosion-resistant coating film by the grazing incidence X-ray diffraction method, the aluminum fluoride hydroxide $AlF_{3-x}(OH)_x$ constituting the corrosion-resistant coating film was amorphous.

The obtained corrosion-resistant member of Comparative Example 4 was subjected to a heating test, and the peeling state of the corrosion-resistant coating film was evaluated. The obtained corrosion-resistant member of Comparative Example 4 was subjected to a corrosion test, and the crack state of the corrosion-resistant coating film was evaluated. The results are shown in Table 1.

As is understood from Table 1, even when the corrosion-resistant members of Examples 1 to 6 were subjected to a thermal history in a nitrogen gas atmosphere and a corrosive gas atmosphere, the peeling and the cracking of the corrosion-resistant coating films hardly occurred. On the other hand, due to the fact that the corrosion-resistant members of Comparative Example 1 to 4 were subjected to a thermal history in a nitrogen gas atmosphere and a corrosive gas atmosphere, the peeling and the cracking of the corrosion-resistant coating films occurred.

When the space group of the aluminum fluoride hydroxide $AlF_{3-x}(OH)_x$ constituting the corrosion-resistant coating film belongs to R-3c and x in the chemical formula is 0.05 or more, it is considered that the corrosion-resistant coating film has sufficient strength against a stress generated by thermal expansion or thermal contraction of the base material in a temperature rise and fall.

When the space group of the aluminum fluoride hydroxide $AlF_{3-x}(OH)_x$ constituting the corrosion-resistant coating film belongs to R-3c and x in the chemical formula is 1.00 or less, the composition of the aluminum fluoride hydroxide $AlF_{3-x}(OH)_x$ constituting the corrosion-resistant coating film is less likely to change even when heat treatment is performed in a chlorine gas atmosphere, in a fluorine gas atmosphere, or in an oxygen gas atmosphere. Therefore, it is considered that volume expansion and volume contraction of the corrosion-resistant coating film due to a temperature rise and fall are less likely to occur. As a result, it is considered that the cracking of the corrosion-resistant coating film is less likely to occur.

REFERENCE SIGNS LIST 10 base material
20 corrosion-resistant coating film

The invention claimed is:

1. A corrosion-resistant member comprising:
   a base material containing aluminum or an aluminum alloy; and
   a corrosion-resistant coating film formed on a surface of the base material, wherein the corrosion-resistant coating film contains aluminum fluoride hydroxide $AlF_{3-x}(OH)_x$ in which a space group belongs to R-3c, and x in the $AlF_{3-x}(OH)_x$ is 0.05 or more and 1.00 or less.

2. The corrosion-resistant member according to claim 1, wherein x in the $AlF_{3-x}(OH)_x$ is 0.10 or more and 0.70 or less.

3. The corrosion-resistant member according to claim 2, wherein a half width of a maximum intensity peak obtained by analyzing the aluminum fluoride hydroxide by an X-ray diffraction method is 0.50° or less.

4. The corrosion-resistant member according to claim 2, wherein
   the base material contains an aluminum alloy containing magnesium, and
   an intermediate layer containing magnesium fluoride is arranged between the base material and the corrosion-resistant coating film.

5. The corrosion-resistant member according to claim 1, wherein x in the $AlF_{3-x}(OH)_x$ is 0.15 or more and 0.50 or less.

6. The corrosion-resistant member according to claim 5, wherein a half width of a maximum intensity peak obtained by analyzing the aluminum fluoride hydroxide by an X-ray diffraction method is 0.50° or less.

7. The corrosion-resistant member according to claim 5, wherein
- the base material contains an aluminum alloy containing magnesium, and
- an intermediate layer containing magnesium fluoride is arranged between the base material and the corrosion-resistant coating film.

8. The corrosion-resistant member according to claim 1, wherein a half width of a maximum intensity peak obtained by analyzing the aluminum fluoride hydroxide by an X-ray diffraction method is 0.50° or less.

9. The corrosion-resistant member according to claim 8, wherein
- the base material contains an aluminum alloy containing magnesium, and
- an intermediate layer containing magnesium fluoride is arranged between the base material and the corrosion-resistant coating film.

10. The corrosion-resistant member according to claim 1, wherein
- the base material contains an aluminum alloy containing magnesium, and
- an intermediate layer containing magnesium fluoride is arranged between the base material and the corrosion-resistant coating film.

* * * * *